United States Patent
Couch et al.

(10) Patent No.: US 12,469,013 B2
(45) Date of Patent: Nov. 11, 2025

(54) METHOD TO MANAGE CABLE TV LEAKAGE WHEN LEAKS ARE NO LONGER DETECTABLE

(71) Applicant: ComSonics, Inc., Harrisonburg, VA (US)

(72) Inventors: Ken Couch, Harrisonburg, VA (US); Raymond Gregory Jones, Stephens City, VA (US); Austin Joachim, Harrisonburg, VA (US)

(73) Assignee: ComSonics, Inc., Harrisonburg, VA (US)

( * ) Notice: Subject to any disclaimer, the term of this patent is extended or adjusted under 35 U.S.C. 154(b) by 251 days.

(21) Appl. No.: 18/335,266

(22) Filed: Jun. 15, 2023

(65) Prior Publication Data
US 2023/0410062 A1    Dec. 21, 2023

Related U.S. Application Data

(60) Provisional application No. 63/366,603, filed on Jun. 17, 2022.

(51) Int. Cl.
G06Q 30/00     (2023.01)
G06Q 10/20     (2023.01)

(52) U.S. Cl.
CPC .................. G06Q 10/20 (2013.01)

(58) Field of Classification Search
CPC ..................................................... G06Q 10/20
See application file for complete search history.

(56) References Cited

U.S. PATENT DOCUMENTS

| | | | | |
|---|---|---|---|---|
| 6,833,859 | B1 * | 12/2004 | Schneider | G01S 5/02525 348/192 |
| 7,395,548 | B2 * | 7/2008 | Runzo | H04B 17/23 455/226.4 |
| 7,952,363 | B2 * | 5/2011 | Jones | G01R 29/0892 725/123 |
| 9,882,663 | B2 * | 1/2018 | Zinevich | G01S 5/021 |
| 11,496,182 | B2 * | 11/2022 | Couch | H04L 5/0048 |
| 12,130,340 | B2 * | 10/2024 | Couch | G01R 31/52 |
| 2003/0022645 | A1 * | 1/2003 | Runzo | H04B 17/0085 348/180 |

(Continued)

OTHER PUBLICATIONS

Song, Zhenghong, et al. "Sensing Shallow Structure and Traffic Noise with Fiber-Optic Internet Cables in an Urban Area." Surveys in Geophysics, vol. 42, pp. 1401-1423, 2021. (Year: 2021).*

(Continued)

*Primary Examiner* — Luis A Brown
(74) *Attorney, Agent, or Firm* — WCF IP

(57) ABSTRACT

Systems and methods improve the actionability of leaks in cable networks. One or more leakage detection confidences (LDCs) are determined to assess the reliability of newer leakage data which conflicts with existing leak records. When confidences fail to exceed predetermined thresholds, records of leaks which failed to be redetected are maintained as actionable and relied upon for the creation of work orders and deployment of technicians to make repairs. Further fail safe conditions may include device health metrics and weather events.

20 Claims, 7 Drawing Sheets

(56) References Cited

U.S. PATENT DOCUMENTS

| | | | | |
|---|---|---|---|---|
| 2010/0026310 | A1* | 2/2010 | Shimp | G01R 31/083 324/527 |
| 2013/0316750 | A1* | 11/2013 | Couch | H04L 41/0618 455/501 |
| 2013/0322569 | A1* | 12/2013 | Murphy | H04L 27/3818 375/320 |
| 2014/0195176 | A1* | 7/2014 | Jones | H04W 16/18 702/58 |
| 2015/0318937 | A1* | 11/2015 | Ruth | H04B 3/32 375/224 |
| 2017/0272184 | A1* | 9/2017 | Zinevich | G01S 5/0246 |
| 2021/0226664 | A1* | 7/2021 | Couch | H04L 27/2601 |
| 2022/0109612 | A1* | 4/2022 | Bush | H04L 43/55 |
| 2023/0024011 | A1* | 1/2023 | Couch | G01R 31/08 |
| 2023/0125748 | A1* | 4/2023 | Yang | G11C 11/5635 365/185.22 |
| 2024/0426943 | A1* | 12/2024 | Couch | G01R 31/52 |
| 2024/0426944 | A1* | 12/2024 | Couch | G01R 31/08 |

OTHER PUBLICATIONS

Zhang, Jun, et al. "Review of Pipeline Leak Detection Technologies." Pipeline Simulation Interest Group, PSIG Annual Meeting, Apr. 2013. (Year: 2013).*

Song, Zhenghong, et al. Sensing Shallow Structure and Traffic Noise with Fiber-Optic Internet Cables in an Urban Area. Surveys in Geophysics, vol. 42, pp. 1401-1423 , 2021. (Year:2021) (Year: 2021).*

Zhang, Jun, et al. "Review of Pipeline Leak Detection Technologies." Pipeline Simulation Interest Group, PSIG Annual Meeting, Apr. 2013. (Year:2013) (Year: 2013).*

* cited by examiner

METHOD TO MANAGE CABLE TV LEAKAGE WHEN LEAKS ARE NO LONGER DETECTABLE

CROSS-REFERENCE TO RELATED APPLICATIONS

This application claims the benefit of U.S. Provisional App. No. 63/366,603, filed Jun. 17, 2022, the complete contents of which are herein incorporated by reference.

FIELD OF THE INVENTION

Embodiments generally relate to managing cable TV leakage and, more particularly, addressing leaks previously detected but which are not re-detected when expected.

BACKGROUND

Cable operators currently have leakage detection solutions that help them manage cable leakage by measuring, collecting, and storing cable leakage data in a database. Cable leakage may generally be defined as a signal of any signal type (including but not limited to one or more of the following: analog, digital, continuous, burst, modulated, non-modulated, upstream, and downstream) that is transmitted across the cable TV network and escapes the cable infrastructure into the air. Thus the cable TV signal that is meant to stay internal to the cable infrastructure is "leaking" into the air. Cable leakage detection typically involves collecting data that includes the leak amplitude level, the GPS location of the leak, the timestamp of when it was detected, and identification of the technician who detected the leak. This is not an exhaustive list of parameters that can be captured and stored for each leak but represents the core of what is typically collected.

Leakage data is collected as field technicians traverse the network as part of their daily work to maintain the cable network. The leakage data can be measured, collected, and stored in a database using available leakage detection gear or can be manually entered by the technician. The data is typically stored in a database, either centralized or localized, and is then utilized by the cable operators to create work orders to send technicians out into the field to locate the leaks via the stored GPS information to fix them. Each work order costs the cable operator money as the technicians must spend their time driving to the leak (truck roll), finding the leak, and fixing the leak. Thus it is important to maintain an accurate database of leaks found in the network so that leakage work orders are not issued to technicians erroneously.

There are instances when a leak is recorded in the database when found, but after some period of time has elapsed since the leak was recorded, the leak ceases to exist or is not detectable in the network. As an example, a very small leak may be recorded on a day under certain weather conditions. The next day the leak is no longer detectable due to weather changes. Cable leakage is sensitive to temperature, humidity, wind, and precipitation, for example, which can cause the leak to change its amplitude levels. If a leak is barely detectable on one day, that same leak may not be detectable at all on another day under different weather conditions. Cable leaks may appear and disappear for a multitude of reasons other than weather. Another example scenario that arises is that a cable leak is fixed by a technician who then fails to record that the leak has been fixed. The common issue that is related to all these scenarios is that a subset of recorded leaks can disappear or are no longer detectable in a cable network.

If a cable operator assigns a work order to a technician to fix a leak that is no longer detectable, the technician will spend their time and energy looking for the leak at the designated location with no results. This costs the cable operator time and money with no tangible work being accomplished.

SUMMARY

An objective of some exemplary embodiments of this disclosure is to minimize or eliminate the creation of work orders and deployment of technicians to fix what records show as leaks but which, in reality, are either not active leaks or which are not presently detectable leaks.

Exemplary methods may, for example, prevent cable operators from creating technician work orders to find and fix leaks which cannot be found. Exemplary methods may, for example, improve the percentage of technician deployments which result in repairs owing to minimization of deployments for leaks, real or perceived, which cannot be detected at the time a repair is attempted. This saves time and money and makes the technicians more productive by only assigning them work that is actionable.

According to some embodiments, exemplary methods automatically remove/delete leaks from the leakage database that are no longer detectable using in part leakage detection equipment to provide a more accurate record of existing leaks. Alternatively, records may be automatically updated to differentiate records corresponding with verified leaks versus records corresponding with leaks which are no longer detected or detectable.

Eliminating records of leaks which are not re-detected (or updating such records with a non-action status) reduces and minimizes a risk of false positives in the leakage existing leakage database. The advantage is fewer (as few as zero) false positive records. A false positive record suggests an actionable leak exists which, in fact, does not. However, an oversimplified adherence to eliminating or changing to non-action status a record for a leak which is not redetected runs a separate risk. When a leak is not re-detected where expected, there is a risk of assuming the record of such leak should be deleted or updated to a non-action status. A leak may exist which is not redetected for reasons concerning equipment problems, weather, or other reasons, as discussed above. Registering non-redetection in this scenario—where the leak does in fact exist—can be or give rise to a false negative record. A false negative record would suggest an actionable leak is not present when in fact it is present. Exemplary methods minimize (even eliminate) false positives by routine comparisons of data from one or more prior data collections with subsequently collected data. Furthermore, exemplary methods minimize (even eliminate) false negatives by implementing fail safe conditions which must be satisfied in order for records to be changed from an action to non-action status or be deleted outright. Depending on the context, a "fail safe" condition may refer to a condition which minimizes the risk of creating false positive records and/or minimizes the risk of creating false negative records.

Decisions for validating existing leak records may rely on a number of variables. Among these is leak detection confidence (LDC). Two different types of LDCs which may be used alone or in combination with one another are so-called driveout LDCs (dLDCs) and node LDCs (nLDCs). A drive path may be generally defined as a geographical path in which leakage data/records were collected over a defined period of time. For purposes of this disclosure, a driveout may refer generally to detection equipment being transported along a drive path, with a drive path being a path in which leakage data is collected over a defined period of time. A node can be generally defined as a geographical area that is served from a specific cable node. If an LDC has a low confidence level, it will cast a level of uncertainty that existing leaks are being detected properly. The LDC uncertainty range may be, for example, between 20% and 50%. For LDCs in this range, additional information may be required to verify the leakage detection equipment is operating properly before a record of a leak is deleted or made non-actionable. If the LDC is below the minimum uncertainty value (e.g., 20%), the confidence level is too low to take any action, thus no leak records affected by such LDC are deleted. If the LDC is above the maximum uncertainty range level (e.g., 50%), action may be taken to delete records of non-redetected leaks without a need for additional information. A user may define the upper and lower confidence range, which can differ from the exemplary values of 20% and 50%, based on the user's own preferences.

In some cases, the number of existing leaks on a drive path may be very small. For example, a technician may driving in a very rural area or perhaps driving the detection vehicle a short distance. When the number of existing leaks is very small, there may not be enough data to produce a statistically valid or reliable LDC calculation. Under scenarios when there are only a few existing leaks for a drive path, generally referred to in this disclosure as a "low-leak driveout", a separate variable or condition may be employed, or existing variables may be altered (e.g., certain comparison thresholds adjusted).

To determine if the leakage equipment is working properly, particularly in situations with low leak driveouts and low LDC values, additional criteria may be employed in record verification processes. Information may be taken directly from the leakage detection equipment to determine the equipment's "device health". A "device health" variable may be required in these types of situations in order to establish that leaks are being properly detected.

Some embodiments include particular features generally intended to protect the data integrity associated with individual nodes. Precautions must be considered when deleting records of leaks from the existing leakage database. In practice, situations arise where a portion of a cable network is experiencing an electrical outage. During an outage, no cable TV signals are traversing the network and thus no leakage will occur. As technicians drive around the network during this time, they will not detect any leaks. Without fail-safe conditions, this situation has the potential to lead to the undesired effect of deleting all of the non-detectable leaks on the technician's drive path during this period of time, despite the non-detection being only temporary and entirely ascribable to the electricity outage. In other words, without fail safe conditions, all existing leaks could be deleted on any part of the network driven during an outage event. Exemplary leakage deletion algorithms have fail safe procedures built-in to prevent erroneous leakage deletion during outage conditions.

It is possible for a single node to have an outage without affecting the rest of the network. For example, the equipment powering the node may have been damaged or has a loss of power. Exemplary leakage deletion algorithms may determine if a node is having possible outage issues to prevent leak records from being removed erroneously. This type of capability provides a granular method of evaluation in which each node is examined individually to determine if a possible outage condition exists.

The majority of leaks are located within the defined geographical boundaries of a node. However, there are instances of leak locations that do not fall within a defined node area. These types of leaks are labeled as "non-node leaks". The number of non-node leaks is typically very small. Therefore calculating a leakage detection confidence level for these types of leaks is often inaccurate as it lacks statistical validity. A better approach is to use the network wide driveout dLDC value which will likely have numerous leaks and therefore be more statistically valid. If the driveout LDC value also has a small number of existing leaks or if it is in the uncertainty range, then the device health variable should be used to add additional confidence.

The algorithm used to determine the LDC for non-node leaks may be the same as the standard driveout dLDC which is equal to the ratio of detected driveout leaks for an active window divided by the number of existing driveout leaks for an active window. The device health is required for an additional confidence level.

DETAILED DESCRIPTION

Figure 1:
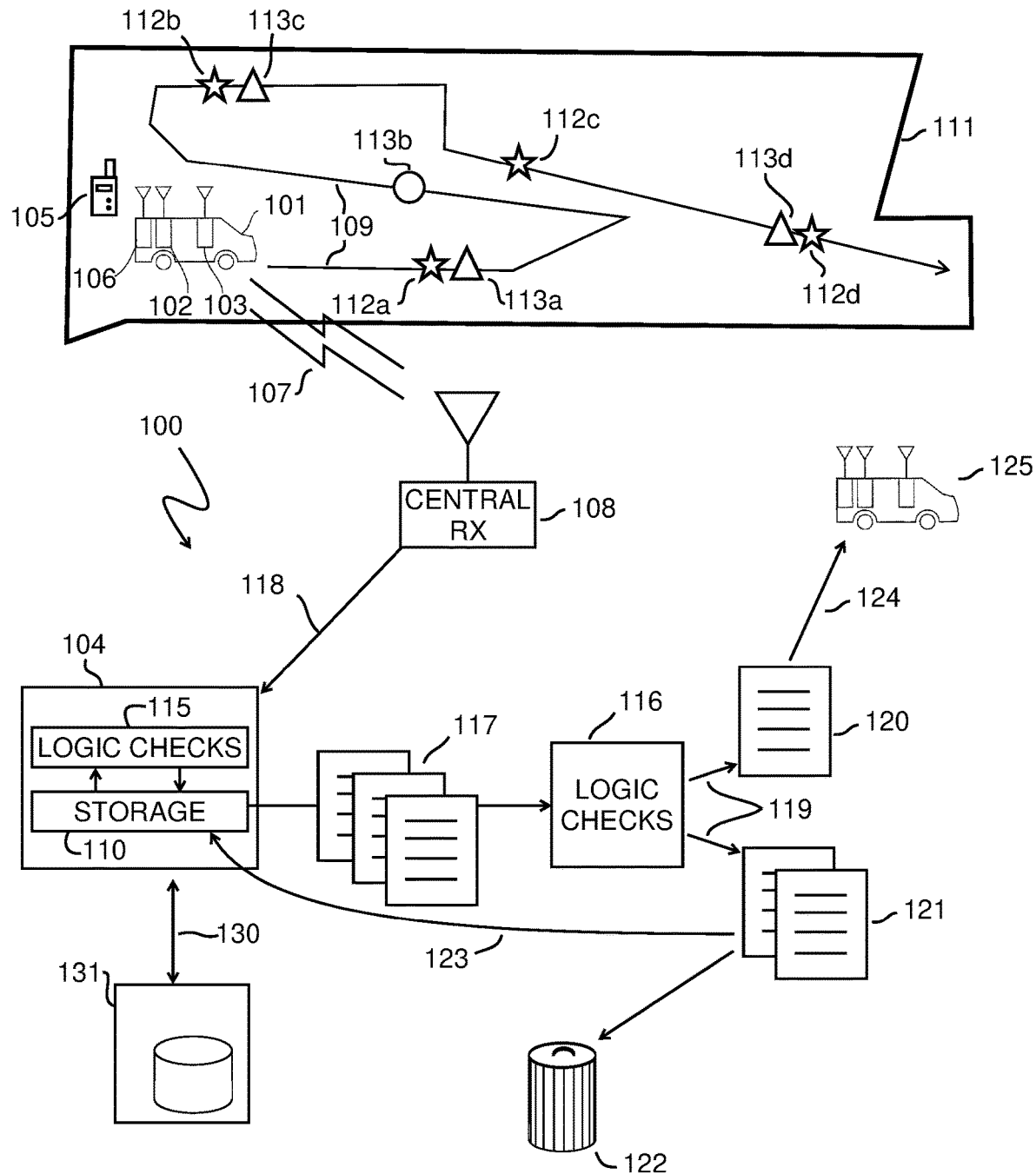
FIG. 1 is a diagram of an exemplary system for maintaining cable infrastructure.

FIG. 1 is a diagram of an exemplary system 100 for cable infrastructure, in particular maintenance of cable infrastructure. One or more computers 104 store leakage data. Computers in this context may be, for example, servers which comprise one or more databases 110. Leakage data may include, for example, leak records for leaks which have been detected at least once and the locations associated with such detection events. Generally, at least detected leaks and their locations are stored. A "leak" is a generally well understood term of art. Briefly, a leak in the context of the present application may be defined as over-the-air signaling that has escaped from cable system. A leak record is a record of such over-the-signaling being detected (at least once) and, typically, information such as the field strength of the detected signal. Leakage detection equipment already used in the industry is suitable for this purpose. At the time of this invention, cable operator companies already collect and store collections of existing leak records. Vehicle and leakage data stored in one or more servers 104 (e.g., cloud servers) may regularly exchange data via wired and/or wireless transmission means 130 with cable TV operator servers 131.

Generally, the leakage detection equipment used by cable operators performs at least two relevant functions: 1) track the technician's vehicle 101 location as the vehicle 101 traverses the network (e.g., with GPS receiver 102), and 2) detect leakage (e.g., with broadband cable system (BCS) signal receiver 103 or other detection device/detector) and the corresponding leak locations as the vehicle 101 traverses the network. Most of the leakage detection equipment deployed by the major cable operators at the time of this invention have these two capabilities. The locations through which the service vehicle 101 travels may simply be logged for later downloading to a server 104/database 110, but it is common for the outputs of both the BCS signal receiver 103 and the GPS receiver 102 be connected to a transmitter 106 for immediate or nearly real-time wireless communication 107 to a central facility 108, as illustrated in FIG. 1. These approaches are effective for populating leakage data 118 in a leakage database 110.

Besides the fairly automated process of leakage record generation produced from vehicle-based equipment, a database 110 may be populated with leak records or have its records updated using other types of devices such as but not limited to handheld detection devices 105, e.g., specialized handheld devices, laptops, tablets, smartphones, etc. Technicians may also create or edit leakage records manually. For instance, a technician may update the status of a leak record to reflect that the documented leak has been repaired after the technician has completed the relevant repair.

Over time, multiple vehicles may be expected to pass within detection range of the same (geographic) locations where leaks may exist. In addition, the same vehicle may repeatedly pass within detection range of the same location where a leak may exist. As technicians travel around the network, the leakage detection system 100 tracks what leaks are detected and where they are detected. The leakage detection system also tracks the technician's vehicle location throughout the trip or work day. This information may be used to create the vehicle's "drive path" 109 for each day or trip. An intended drive path may be predefined for a vehicle 101 but the actual drive path 109 actually taken by the vehicle 101 is the drive path generally of interest for exemplary methods of this disclosure.

FIG. 1 illustrates maintenance/technician vehicle 101 as taking a drive path 109 through a node 111 (limits of which may be defined by a node geo-boundary). Along the drive path 109 there are three distinguishable types of leak-related items that may arise. These are marked in FIG. 1 by geometric symbols. The locations 112 of so-called existing leaks are marked by a star in FIG. 1. Based on leak records in database 110, there is an expectation that the detection equipment of vehicle 101 will detect a leak when it is passing the locations 112a, 112b, 112c, and 112d along drive path 109. Leaks which are actually detected by the equipment of vehicle 101 have their locations 113 indicated in FIG. 1 by either a triangle or a circle. Each leak location 113 (namely locations 113a, 113b, 113c, and 113d) is the location of an actually detected leak on this particular trip (e.g., driveout). A location 113 of a detected leak which matches the location 112 of an expected/existing leak is marked by a triangle symbol. A location 113 of a detected leak which does not match any location 112 of an expected/existing leak is marked by a circle symbol. In other words, locations like location 113b are locations where the detection equipment detects a leak for which no existing leak record exists (or more specifically, no leak record exists for a leak which is expected to be actively leaking; a record may exist for the location in question which reflects that a leak existed in the past but no longer exists, e.g., because of a repair performed or because the leak was previously marked as no longer existing). Newly created leak records such as a record of leak 113b are not generally used as part of an LDC calculation during the current time period in which they are found as they cannot be considered previously existing leak records but are rather used as existing leak records in future LDC calculations.

In FIG. 1, there is a location 112c for which leak records of database 110 indicate there is an existing leak; however, the equipment of vehicle 101 does not detect any leak at this location as it travels along the trip path 109. These types of leaks and their locations are a focus of exemplary embodiments. If a leak detected in the past is no longer detectable in the present, how can it be found and repaired? Exemplary embodiments identify which leaks are no longer detectable within certain confidence criteria so they can be removed from the database.

Any leak location for which any detector (configured to be actively detecting) passes within detection range at least twice may be subject to exemplary validation procedures that improve the reliability of leak records and actions taken in dependence on those records, in particular the assignment and deployment of technicians to repair leaks associated with such records. In the illustrative example of FIG. 1, location 112a/113a, location 112b/113c, location 112c, and location 112d/113d all qualify as having been passed by one or more detection equipment apparatuses at least twice. Only location 113b does not meet this criterion.

For purposes of this disclosure, instances of detection equipment being within detection range of a given location where a leak may exist may be referred to as "events". When discussing the data collected for two separate events, the events may be referred to as the earlier event and later event, respectively. The events may be, for example, trips made by a technician. The events may be referred to as driveouts, as is common to label a single trip such as that which may be made by a technician in a vehicle. For purposes of this disclosure, a driveout may refer generally to detection equipment being transported along a drive path, where a drive path being a path in which leakage data is collected over a defined period of time. The means for the transportation of the detection equipment may vary among embodiments. As non-limiting examples, a person may conduct a driveout by physical locomoting with his or her legs; a vehicle may conduct a driveout with or without a technician controlling the vehicle; or a drone or self-driving car may conduct a driveout. Driveouts may be achieved by apparatuses which fly, e.g., drones.

Events may simply be identified according to calendar days (e.g., a comparison may be made between the data collected on two different calendar days) or some other increment of time. In any of these circumstances, irrespective of terminology, there are at least two instances separated by a known (and non-zero) amount of time, where in each instance the same location is subject to evaluation by one or more detectors. For ease of discussion, much of this description relies upon the term "driveout", e.g., data being compared may be from an earlier driveout and a later driveout. The "earlier" and "later" qualifiers are with respect to one another; that is to say, the "earlier driveout" occurs at an earlier time (and typically earlier date) relative to the "later driveout". The "later driveout" occurs at a later time (and typically a later date) relative to the "earlier driveout". It should be appreciated that despite the regular use of "driveout" in this disclosure, the term "driveout" may be substituted with "event" or other terms consistent with this and the preceding paragraph which explain different events.

A leak which is repeatedly and consistently re-detected at a particular location is actionable. Actionable in this context means it is a leak which has a reasonably high likelihood of being detected at a future time when a technician arrives to make a repair to resolve the leak. For most types of leaks in the industry, it is necessary for detection of a leak to be possible at the time a technician attempts to repair a leak. Generally, leaks detected during a driveout have a relatively broad location description. Accordingly, to pinpoint a site of a leak, a technician generally must rely on additional leakage detection equipment used on the repair trip itself.

In this disclosure, "checks", "validation", "verification", "confirmation" and similar terminology may be used to refer to a process or processes by which older records and newer records/data which pertain to the same location or locations are compared and inconsistencies between them, if present, are resolved. Resolution may involve a decision to maintain details in the older record as-is, or else update the older record with the newer details, or else to delete the older record. "Record" as used herein may be used to describe a datum, data, or dataset which stores information, typically information describing at a minimum a location and a leak (e.g., type of signal, signal strength, etc.) detected at that location on one or more occasions (that is to say one or more events, e.g., one or more driveouts). "Location" as used herein may be defined, for example, as a specific set of GPS coordinates on a geographical map. The "same" location may be defined as a radius of a defined distance surrounding a specific set of GPS coordinates. The defined distance may range from 50 to 150 feet, for example. As illustration, if a leak is detected within 50 feet of a previously detected leak, the two detections may be considered to be at the same location and may be assumed to be the same leak for some exemplary algorithms in this disclosure. Exemplary validation processes according to this disclosure may be performed for any given location at multiple process stages. Following are two exemplary stages.

FIG. 1 depicts, as a first example of exemplary timing, a validation process 115. The validation process 115 is made with respect to a particular location or recorded leak. The validation process 115 may be performed whenever the system 100 sends to the computer(s) 104 (and/or whenever the computer 104 receives) detection data 118 for a location for which a record of leak already exists in the database 110. A validation process 115 may be performed immediately, or as soon as possible, upon the arrival of the newer detection data 118 to resolve any inconsistencies between the historical data already in database 110 and the newer data 118.

As a second example, a validation process 116 may be performed at any point prior to but preferably no later than production of a work order instructing that a leak for which a leak record exists in database 110 be fixed. Under this circumstance new detection data 118 may be stored for a period of time without substantial or any comparison with existing records in database 110. It is advantageous in some embodiments to perform checks 116 on a preset interval, in particular, an interval corresponding with actual work shifts responsible for generating the detection data 118. For example, logic checks 116 may be performed after a 16 hour period, since this amount of time covers the time period of a typical double shift in the industry. A vehicle 101 may be driven by several technicians within a single day. Thus it may be desirable that the logic check is performed after each work period on a daily basis and made available before the start of the next work day.

The validation process 116 may be performed on one or more existing leak records 117 at a time. For instance, the validation process 116 may be performed on as few as a single leak record, e.g., shortly before the leak record in question is used for generating a corresponding work order. Alternatively, the validation process 116 may be performed on batches of existing leak records 117. The existing leak records 117 are accordingly sorted 119 into separate groups: a first group with those records 120 identified as validated versus a second group with those records 121 which are subject to deletion 122 or else updating 123 in database 110. In either of the latter results (deletion 122 or update 123), a work order for repair of the recorded leak would ordinarily not be generated. By contrast, validated existing leak records 120 include leak records which, despite data 118 indicating a lack of re-detection, are identified as satisfying one or more fail safe conditions. It is therefore appropriate and desirable that such leak records be considered "actionable," meaning appropriate to serve as the basis for generating work orders for technician repairs.

Leak records 120 which have passed validation checks 116 are desirable to rely upon for work order creation and deployment of technicians to make repairs. Work orders are sent 124 and vehicles/technicians 125 deployed to repair leaks corresponding with the validated leak records 120.

Exemplary logic checks 115 and 116 involve the calculation and evaluation of one or more parameters generally referred to herein as fail-safe conditions. Prior to describing their application for the evaluation and validation of detection data 118 or records 117, however, the exemplary variables usable in various combinations will first be described. Following are several exemplary variables usable in various combinations to determine if a leak should be deleted from the leakage database (or updated, e.g., labeled as non-actionable) according to one or more confidence thresholds. This list is not exhaustive and may be expanded to include other types of information depending on a specific implementation or embodiment.

An exemplary variable may be referred to as a drive path. As technicians travel around the network, the leakage detection system tracks the technician's vehicle location throughout the work day. This can be used to create the vehicle's "drive path" for each day. A drive path may be, for example, a series of GPS coordinates or a series of street names or the like. A single drive path may traverse one node or multiple nodes.

Figure 2:
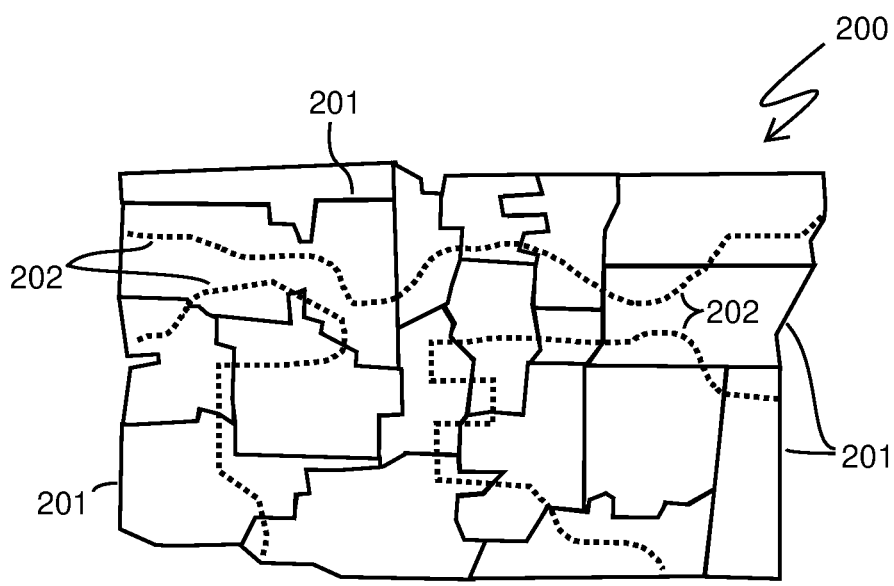
FIG. 2 is a map depicting example nodes and their respective boundaries.

FIG. 2 depicts a map 200 of a geographical region including streets. A cable network is typically divided up into small geographical areas known as nodes, which typically each service 100 to 400 homes. FIG. 2 shows an example of a small geographical area in which solid lines 201 represent node boundaries. Vehicle drive paths are represented by the dotted lines 202 and show where the vehicles have driven over a defined period of time.

Another exemplary variable may be referred to as the number of leaks expected. A subtype of this variable is the number of leaks expected per driveout. This variable may be determined using a defined drive path and historical data in the existing leakage database. The number of leaks expected may be the number (and location(s)) of "existing leaks" within a "defined range" of a technician's drive path over the course of a work day. A technician's drive path may be an entirety of a technician' drive path on a single work day or a part which is less than a whole of the drive path on the work day in question. The list of existing leaks associated with the technician's drive path are identified in the leakage database. This list of leaks may be identified as "existing leaks", and their records may be referred to as existing leak records. The "defined range" is the maximum distance, e.g.

in feet, a leak must be to the drive path to be counted. As a non-limiting example, the range may be 150 or 200 feet, according to the range and configuration of presently available detection devices. The number of leaks expected per driveout may fall locationally into one node or multiple nodes.

Another exemplary variable may be referred to as the number of leaks detected. A subtype of this variable is the number of leaks detected per driveout. This is the number (and location(s)) of the leaks that were actually detected on the technician's drive path over the course of a single work day or "active window". The active window may be defined in hours. An exemplary active window range is 15 to 24 but is not limited to these values.

Another subtype to number of leaks expected may be referred to as the number of leaks expected per node. This variable may be determined using the drive path data and historical data in the existing leakage database. The number of leaks expected per node may be reported as the number (and location(s)) of existing leaks in each node that are within range of a vehicle's drive path over the course of a work day or active period. Note that if a drive path for a given driveout passes through, say, three different nodes, the driveout in question corresponds with three separate "expected leak" numbers for this variable, one for each respective node.

Another subtype to number of leaks detected may be referred to as the number of leaks detected per node. This is the number (and location(s)) of detected leaks in each node that are within range of a vehicle's drive path over the course of a work day or active period. Note that if a drive path for a given driveout passes through, say, three different nodes, the driveout in question corresponds with three separate "detected leaks" numbers for this variable, one for each respective node.

Another exemplary variable may be referred to as a leakage detection confidence (LDC). Multiple types of LDCs may be used alone or in combination with one another for an exemplary verification process.

One type of LDC may be referred to as a driveout LDC (dLDC) or a trip LDC. A driveout LDC may be a ratio of (i) number of leaks detected on a defined drive path (e.g., driveout) to (ii) number of leaks expected on the same drive path (e.g., driveout). More specifically, a dLDC may be the ratio of detected leaks located on a drive path within an active window to the expected number of leaks on the same drive path according to existing leak records (detected/existing leaks). The dLDC provides a confidence level that the leakage detection equipment is working and is finding the existing leaks properly.

Another type of LDC may be referred to as a node LDC (nLDC). A node LDC may be a ratio of (i) number of leaks detected on a defined drive path which are within a single node and (ii) number of leaks within the same node expected on the same drive path. The nLDC provides a confidence level that the node is working where a previously reported leak is expected to be, according to existing leak records in the existing leakage database. nLDC is an exemplary logic check made on a node-by-node basis. Every node of one or more nodes may individually analyzed using a nLDC to determine if leaks that were not detected inside the node boundary should be deleted (or updated to nonactionable) from the existing leakage database.

Another exemplary variable is an LDC threshold. Such a threshold is an exemplary metric with which to compare a corresponding LDC. This comparison may control, or at least contribute to, the decision of what next step is taken after the LDC is calculated. If an LDC falls below a corresponding LDC threshold, certain actions may be deliberately avoided or not undertaken in connection with the LDC. For instance, a record associated with the LDC may not be deleted, or the record may not be updated to non-actionable, if the LDC fails to exceed the corresponding LDC threshold. Conversely, certain actions may be deliberately taken. For example, despite a later driveout suggesting a leak is no longer detectable, if such leak is associated with one or more LDCs which fall below their corresponding LDC thresholds, a work order to repair such leak may still be created and a technician sent to repair the leak and fulfill the work order.

If an LDC is at or above an LDC threshold, one or more particular actions may be deliberately taken. For example, when a later driveout suggests a leak is no longer detectable, and such leak is associated with LDCs which meet or exceed their corresponding LDC thresholds, a record of such leak may be deleted or updated to be non-actionable. Conversely, certain other types of actions may be deliberately avoided. For example, when a later driveout suggests a leak is no longer detectable, and such leak is associated with LDCs which meet or exceed their corresponding LDC thresholds, a work order may deliberately not be issued, and a technician will deliberately not be sent to fix the leak. Rather, the technician may be sent to repair some other leak. The particular value of any LDC threshold may vary from one embodiment or implementation to another. It is desirable for some embodiments that the particular threshold values ultimately be set by each cable operator depending on its individual requirements. Non-limiting exemplary thresholds include 10% (0.1), 20% (0.2), 30% (0.3), 40% (0.4), 50% (0.5), and 51% (0.51). As will be discussed in greater detail below, an LDC threshold's value may be changed (e.g., set higher or set lower from a previous use of the threshold) depending on the relevant node at issue or the particular drive path at issue. Accordingly, the node LDC for a first node and a node LDC for a second node may each be compared with a different value of nLDC threshold. A driveout LDC for a first driveout and a driveout LDC for a second driveout may each be compared with a different value of dLDC threshold.

nLDC is a form of node protection, in particular data integrity protection with respect to a single node. Exemplary embodiments may collect and examine data for both existing and newly detected leaks that are located on a technician's drive path and from this information determine if there is a possible node problem. The database has a record of the number and location of existing leaks within each node. Using the technician's drive path, the number of existing leaks and the number of detected leaks is determined for each node. Similar to the dLDC, the ratio of detected leaks to existing leaks within a single node provides a possible indication of problems in the node. For example, if there are numerous existing leaks in the node and none of them were detected during the vehicle's drive out, it is a reasonable assumption that something may be wrong with the node.

Figure 3:
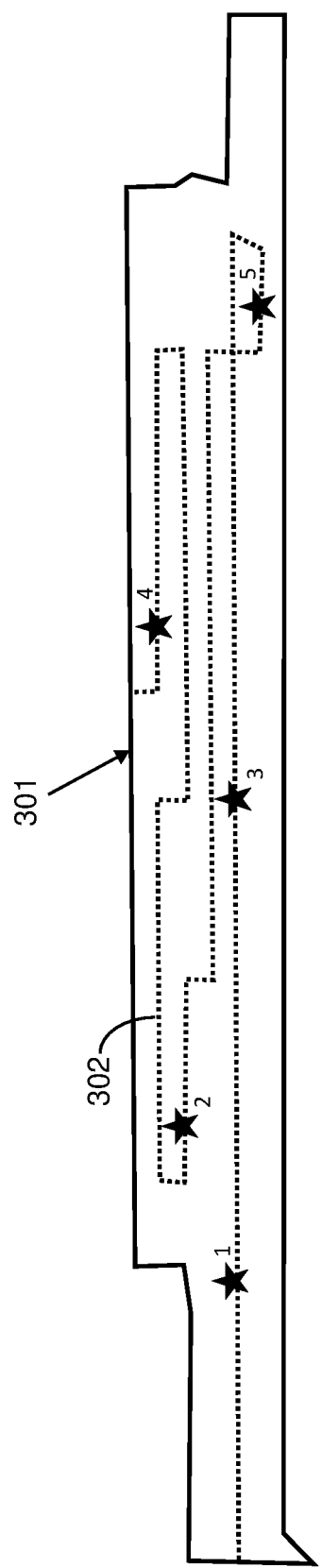
FIG. 3 is a map depicting a single node with drive paths and expected leaks marked, as an example scenario in which a node LDC may be calculated and compared with a node protection threshold.

FIG. 3 depicts a single node with boundary 301. Drive paths are shown by dotted lines 302. There are five existing leaks represented by stars 1, 2, 3, 4, and 5. If a vehicle drives the streets in this node and only detects one of the five existing leaks, the leakage detection confidence for this node would be ⅕ or 20%. If the nLDC threshold (i.e., node protection threshold) were set to >25%, this driveout would fail the node protection threshold. Thus records of the four leaks that were not detected would not be deleted.

Driveouts (and corresponding driveout LDCs) may be rated, categorized, or weighted on a basis of sampling size. Comparably, nodes (and corresponding node LDCs) may be rated, categorized, or weighted on a basis of sampling size. Sampling size in the context of a driveout may be set equal to the number of leaks expected per driveout. Sampling size in the context of a node may be set equal to the number of leaks expected per node. In either case, the number of leaks expected may be compared with a sampling size threshold. Generally speaking, smaller sampling sizes imply less statistical certainty of an LDCs reliability; larger sampling sizes imply greater statistical certain of an LDCs reliability. An LDC threshold value may be changed based on a comparison of sampling size with sampling size threshold. Said differently, an LDC may be weighted differently based on a comparison of sampling size with a sampling size threshold. As a result, sampling size and sampling size threshold may both impact a decision with what to do respecting to a leak record which is candidate for deletion/update to non-actionable.

Driveouts may be categorized into one or more categories, e.g., two categories such as "high-leak" or "low-leak". A driveout LDC calculated for a high-leak driveout may be paired with a driveout LDC threshold which is lower than a driveout LDC threshold paired with the driveout LDC calculated for a low-leak driveout. Stated another way, a driveout LDC calculated for a low-leak driveout may be paired with a driveout LDC threshold which is higher than a driveout LDC threshold paired with driveout LDC calculated for a high-leak driveout. Here "paired" refers to which threshold value of multiple possible threshold values is used as basis of comparison for the LDC. A driveout with n or more expected leaks may be labeled a high-leak driveout. A driveout with n−1 or fewer leaks may be labeled a low-leak driveout. In this situation n is a natural number, not including zero. In other words n is a positive whole number. As non-limiting examples, n may be set 5 or 6 or 7. It is desirable for some embodiments that the particular threshold values for sampling size ultimately be set by each cable operator depending on its individual requirements. An exemplary system may therefore store multiple different values of driveout LDC threshold, and exemplary validation processes made for each of one or more driveouts compare the sample size for the respective driveout with the sample size threshold to determine which of the available driveout LDC thresholds to compare against the LDC for the respective driveout.

Nodes may be categorized into one or more categories, e.g., two categories such as "high-leak" or "low-leak". A node LDC calculated for a high-leak node may be paired with a node LDC threshold which is lower than a node LDC threshold paired with the node LDC calculated for a low-leak node. Stated another way, a node LDC calculated for a low-leak node may be paired with a node LDC threshold which is higher than a node LDC threshold paired with node LDC calculated for a high-leak node. Here "paired" refers to which threshold value of multiple possible threshold values is used as basis of comparison for the LDC. A node with m or more expected leaks may be labeled a high-leak node. A node with m−1 or fewer leaks may be labeled a low-leak node. In this situation m is a natural number, not including zero. In other words m is a positive whole number. As non-limiting examples, m may be set 4 or 5 or 6. It is desirable for some embodiments that the particular threshold values for sampling size ultimately be set by each cable operator depending on its individual requirements. An exemplary system may therefore store multiple different values of node LDC threshold, and exemplary validation processes made for each of one or more nodes compare the sample size for the respective node with the sample size threshold to determine which of the available node LDC thresholds to compare against the LDC for the respective node.

Another exemplary variable is device health. This may be, for example, a qualitive rating. In some embodiments, a central system may remotely measure and monitor a device health status of the leakage detection device (or devices) equipped for one or more vehicles performing driveouts. The device health status may be given as a binary, such as pass or fail, or good or bad. This may be generalized to describing a device health metric as including at least a first status and a second status. The first status signifies the device is operating as expected or desired and therefore data of such device may be relied upon. The second status signifies the device is definitively not operating as expected or desired and therefore data of such device is not reliable. Whatever the labeling, in the binary configuration one option indicates the device cannot be relied upon and the other of the two options indicates the device may be relied upon.

The selection of which device health rating to ascribe a given device may be based on a multiple of different parameters which are collected and stored in one or more central databases. Device health is different from LDCs and may be used to provide a completely additional decision gateway, e.g., whether to check an LDC in the first place, or else whether to trust and act upon a determined LDC, irrespective of how it compares with an LDC threshold. In other words, a device health variable may be used to ensure one or more leakage detection confidence levels are a legitimate reflection of a state of network leaks or rather a reflection of a detection device which is not performing as expected and required for accurate readings. If a leakage detection device is not working properly, the ability to accurately determine if leaks have become non-detectable degrades proportionally.

Figure 4:
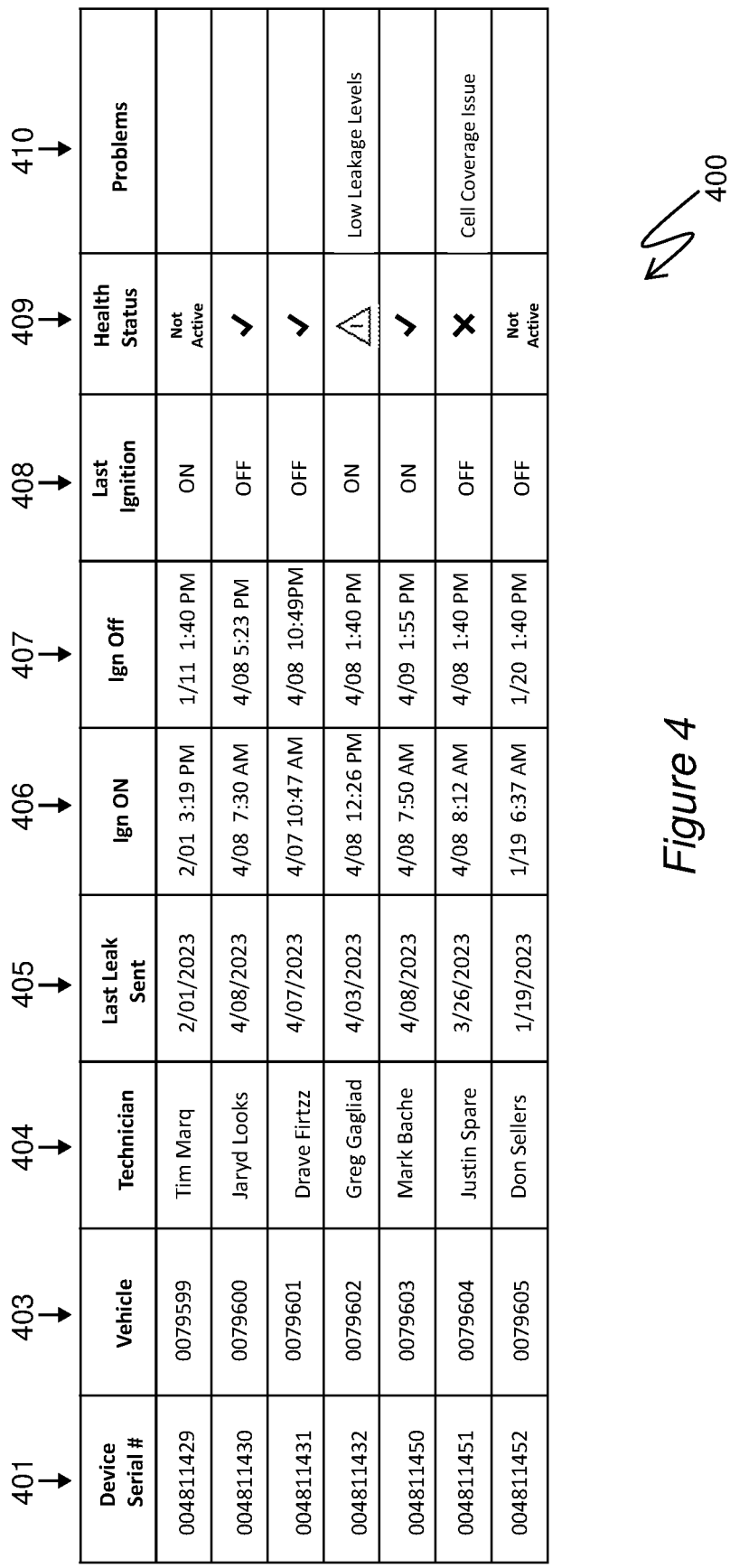
FIG. 4 is an exemplary graphical user interface (GUI) conveying device health information for detection devices.

FIG. 4 depicts an exemplary graphical user interface (GUI) 400 which may be included in some embodiments for individually conveying device health information to one or more users. The interface 400 is configured to identify, at a minimum, individual detection devices and a health status for each. In the illustrative example of FIG. 4, individual detection devices IDs are given as device serial numbers in column 401 and their respective health statuses are provided in column 409. Health statuses may be given according to a fixed set of labels, a numeric, and/or indicia, for example. Here a "good"/"passing"/"normal" health status is conveyed by a check mark. A "bad"/"failing" health status is conveyed by a 'X'. In a purely binary arrangement, these may be the only two health statuses, representing the polar opposite status of one other. FIG. 4, however, provides two exemplary intermediate statuses as well. An exclamation symbol is a warning status that represents some technical issue exists with the respective detection device, but the issue may or may not be affecting the detection data obtained from the detection device. For devices with this status, it is desirable to include in the interface an explanation of the issue, e.g., as provided in column 410. A non-limiting list of possible issues include: failure to report some but not all leaks, low RF levels detected, loose power connections, and cell coverage issue. The fourth health status depicted by FIG. 4 is depicted as the text phrase "NOT ACTIVE". This status may alternatively be referred to as a "null", "offline", or similar descriptor. For devices with this status, the devices are simply not in active use. They are not transmitting detection data but they are not expected to be transmitting data.

FIG. 4 presents a variety of other data which, depending on the embodiment, may or may not be stored and/or presented in connection with health status metrics and interfaces which depict health status. These further data may include an identification for the vehicle transporting the detection device (column 403), an identification of the technician operating the vehicle and/or detection device (column 404), a timestamp of the last leak sent by the detection device (column 405), a timestamp of the last time the vehicle transporting the detection device began operation (last ignition on, "IgnOn") (column 405), a timestamp of the last time the vehicle transporting the detection device ceased operation (last ignition off, "IgnOff") (column 406), an indication of the last reported ignition status (e.g., ON or OFF) (column 408), and a summary of conditions over past days. The latter may include, for example, the number of days a presently existing problem has been in existence; the number of days a device has been not active, and/or the number of days a device has had a normal/good health status. In this context, "timestamp" or "time" include both a time (e.g., according to the 24 hour clock) and a date (e.g., consisting of a day, a month, and a year).

As mentioned above, threshold values used in the conditions can be altered based on user/customer preferences to be either more liberal or conservative on leakage record deletion/updating. As non-limiting examples, variables and sample starting recommended values may be as follows: Driveout LDC Minimum: >20%; Node LDC Minimum: >20%; High-Leak Driveout Minimum: 6 or more existing leaks; Low-Leak Driveout Maximum: 5 or less existing leaks; High-Leak Node Minimum: 4 or more existing leaks; Low-Leak Node Maximum: 3 or less existing leaks; and Device Health: Pass or Fail.

Another exemplary variable, or class of variables, is weather conditions. Some embodiments may include as one or more fail safe conditions: lack of expected redetection is attributed or attributable to a weather event or weather condition. Weather conditions such as but not limited to temperature, precipitation, and humidity sometimes have a direct bearing on whether some leaks are detectable or not. For example, rain tends to cause the number of leaks that can be detected to drop. The same is true with cold temperatures. Exemplary embodiments may collect and store weather information and associate it with a leak at the time it was detected. Exemplary embodiments may also collect and store weather information and associate it with records which are candidates for deletion, and/or records which are deleted and/or records which are updated to be nonactionable. This is particularly helpful for repeat leaks.

As an example to illustrate the usefulness of using weather data for repeat leaks: A certain leak may only manifest itself when the temperature is above 50 degrees F. The leak will not be readily detectable once the temperature is below 40 degrees F. Over the course of 30 days, the leak is repeatedly detected during the middle and late part of a day when the temperature is above 50 degrees and is repeatedly deleted in the morning when the temperature is below 40 degrees F. Once a leak is identified as a repeat, the weather and time information associated with the leak's deletion and detection are used for further evaluation. This may provide a direct correlation with when the leakage is detectable and when it is not. The cable operator can then use this information to fix the leak by sending a technician out to the leak site during the time of day when the temperature is above 50 degrees F.

Some embodiments may include a feature of identifying specific leaks that are repeatedly deleted and reappear over time. These leaks are commonly referred to as "repeat leaks". The process to delete leaks from the existing leakage list can occur by using the method described above or by the cable operator fixing the leaks which results in their deletion. When the leaks are deleted using either method, a historical account may be maintained and updated to track the when such leaks were removed and by which method. If a deleted leak is detected again in the same location, it will be treated as a new leak; however it will also be tagged as a leak that has reappeared in the same location as a previous leak. This method can track the number times a leak has been deleted and how many times it has reappeared. Once a leak reaches a certain number of repeated deletions and reappearances, it may be flagged as a "repeat leak". Thresholds and conditions are set to determine when a leak should be flagged as a repeat. For example, threshold and conditions may include: number of times a leak has been deleted; number of times a leak has reappeared in same location; and time span in which the leak has been deleted and reappeared. For example, a repeat leak may be defined as a leak which has appeared and been deleted at least 3 times within a 30 day period. Identifying repeat leaks is very helpful to cable operators as it allows them to treat these leaks differently when attempting to fix them.

Figure 5:
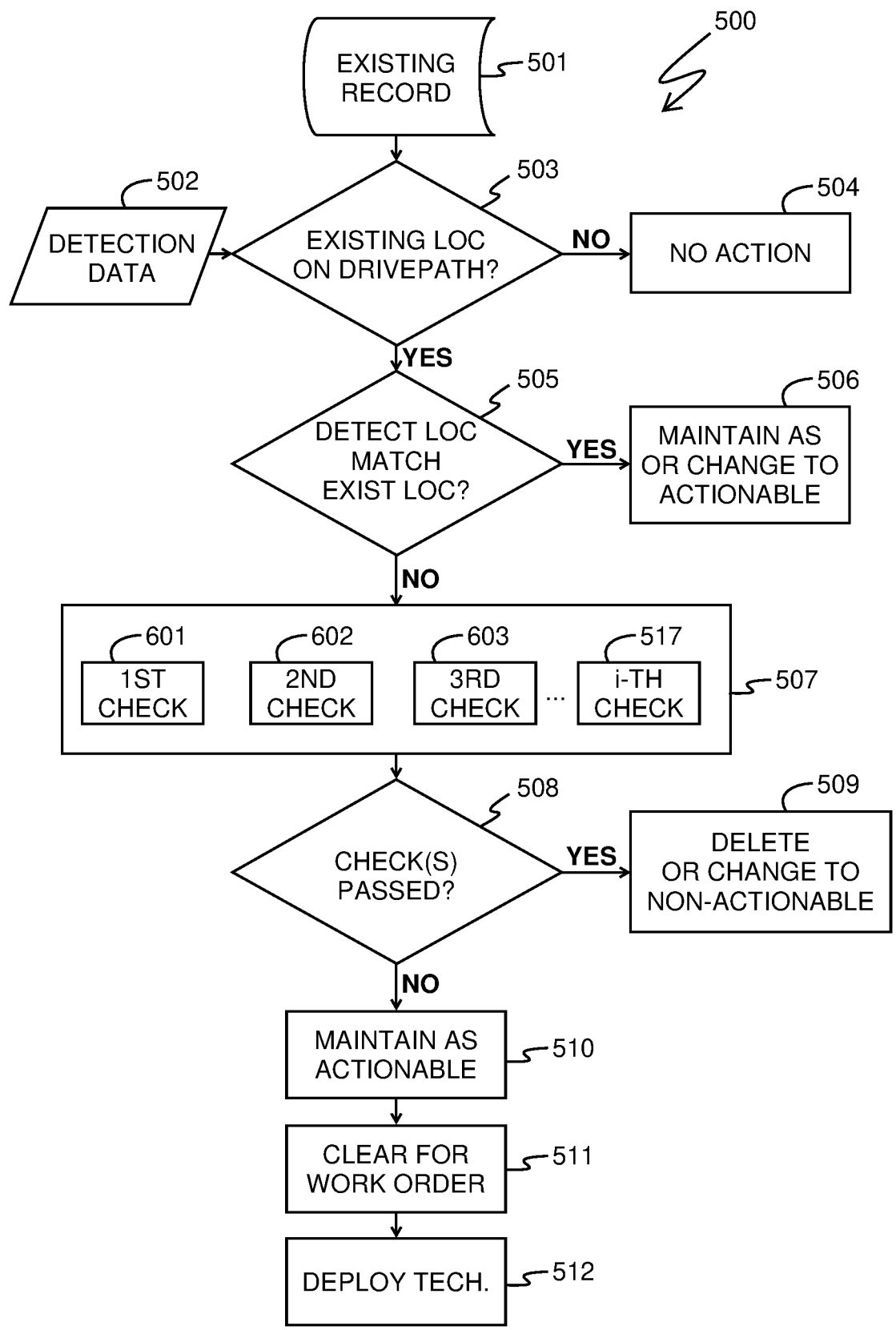
FIG. 5 is an exemplary process for comparing and validating records and leakage data.

FIG. 5 gives a high level depiction of an exemplary process 500 for validating an existing leak record 501 and/or later detection data 502 (also referred to interchangeably as leakage data in this disclosure). The process 500 may be applied with respect to any of one or more existing records 501 with respect to later detection data 502. In this context, detection data characterized as "later" refers to the fact that such data did not contribute to the existence or content of existing record 501 at the time process 500 is performed. The existence of record 501 at the beginning of process 500, including any updates to record 501 that preceded process 500, were not the result of "later" detection data employed concurrently as record 501 at the outset of process 500. See the discussion above of concerning "earlier" and "later" events. An existing record 501 was created as a result of (and/or was last updated as a result of) an earlier event, whereas the later detection data 502 is the result of a later event.

At block 503 of process 500, the drive path of detection data 502 is compared with the location (abbreviated as "loc") in the existing leak record 501. This comparison may also be described as follows: the locations defining the drive path are compared with the location in the existing leak record 501. If the location in the leak record 501 is not a location on the drive path, then no further action (block 504) need be taken with respect to the record 501. In this scenario, the record 501 is neither validated by nor invalidated by the detection data 502. The detection data 502 simply does not apply to (i.e., is not irrelevant to) the record 501 in question.

The validation process 500 continues, however, if at block 503 the location in the existing record 501 is on the drive path of detection data 502. Proceeding to block 505, the location from the existing record 501 is compared against the leak locations in detection data 502. If the location of a detected leak in the detection data 502 matches the location of the record 501, the status of the leak in record 501 is maintained as an actionable status (block 506), meaning action steps are warranted/desirable to have the leak fixed by a technician (e.g., a work order generated and a technician deployed to repair the leak). Process 500 may be performed strictly with respect to existing records which have, at the start of process 500, an actionable status. Alternatively, if desired for some embodiments, the existing records subjected to process 500 may have either an actionable or non-actionable status at the outset of process 500. In this case, if block 505 returns a matching location, and the existing record 501 shows a non-action status, then the status may be changed/updated at block 506 to an actionable status.

If block 505 instead shows no location match between an existing record 501 that has an actionable status and the leak locations of detection data 502, then the record 501 becomes a candidate for deletion/removal, or alternatively a status update, e.g., from actionable to non-actionable. Prior to committing to this change to record 501, however, one or more fail-safe conditions are checked at blocks 507/508. The total number of conditions/checks may be i, where i is a positive whole number. For purposes of illustration, FIG. 5 depicts a first check 601, a second check 602, a third check 603, and so on up to the ith check 517.

The fail-safe conditions concern the reliability of the detection data 502. If the checks are passed at block 508, then the record is deleted or updated to non-actionable status at block 509. Alternatively, if the one or more checks are not passed at block 508, then the detection data 502 is deemed too unreliable to effect a change to the record 501, and the record's actionable status is maintained at block 510. Arriving at block 510 may be regarded as validating the record 501 and invalidating the detection data 502. Accordingly, record 501 is cleared (or remains clear) for action steps to be taken such as but not limited to a work order being generated at block 511 for the record's leak and a technician being deployed to fix the leak at block 512.

Figure 6A:
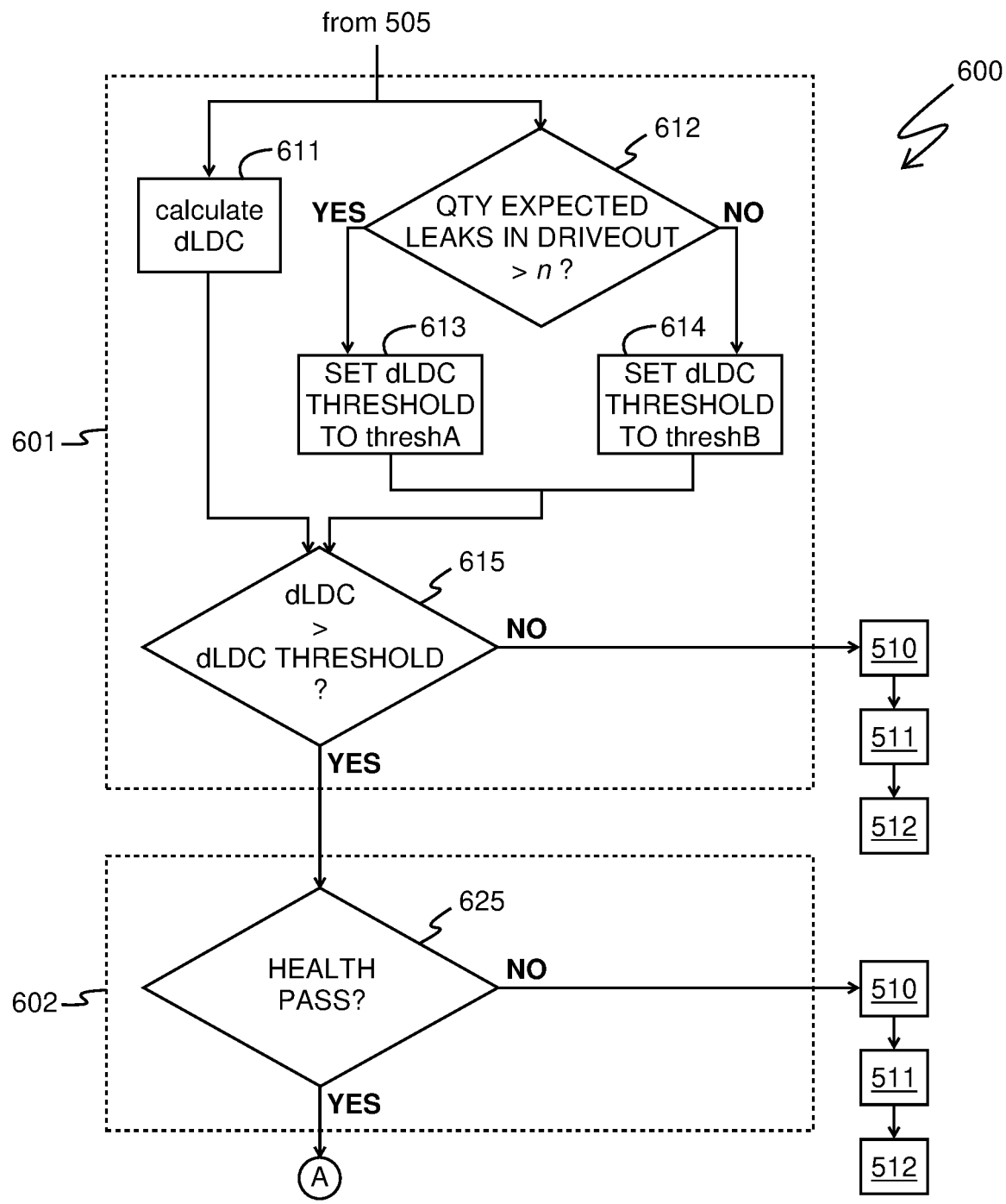
FIGS. 6A and 6B are an exemplary series of subprocesses which check conflicting data against different fail-safe conditions.
Figure 6B:
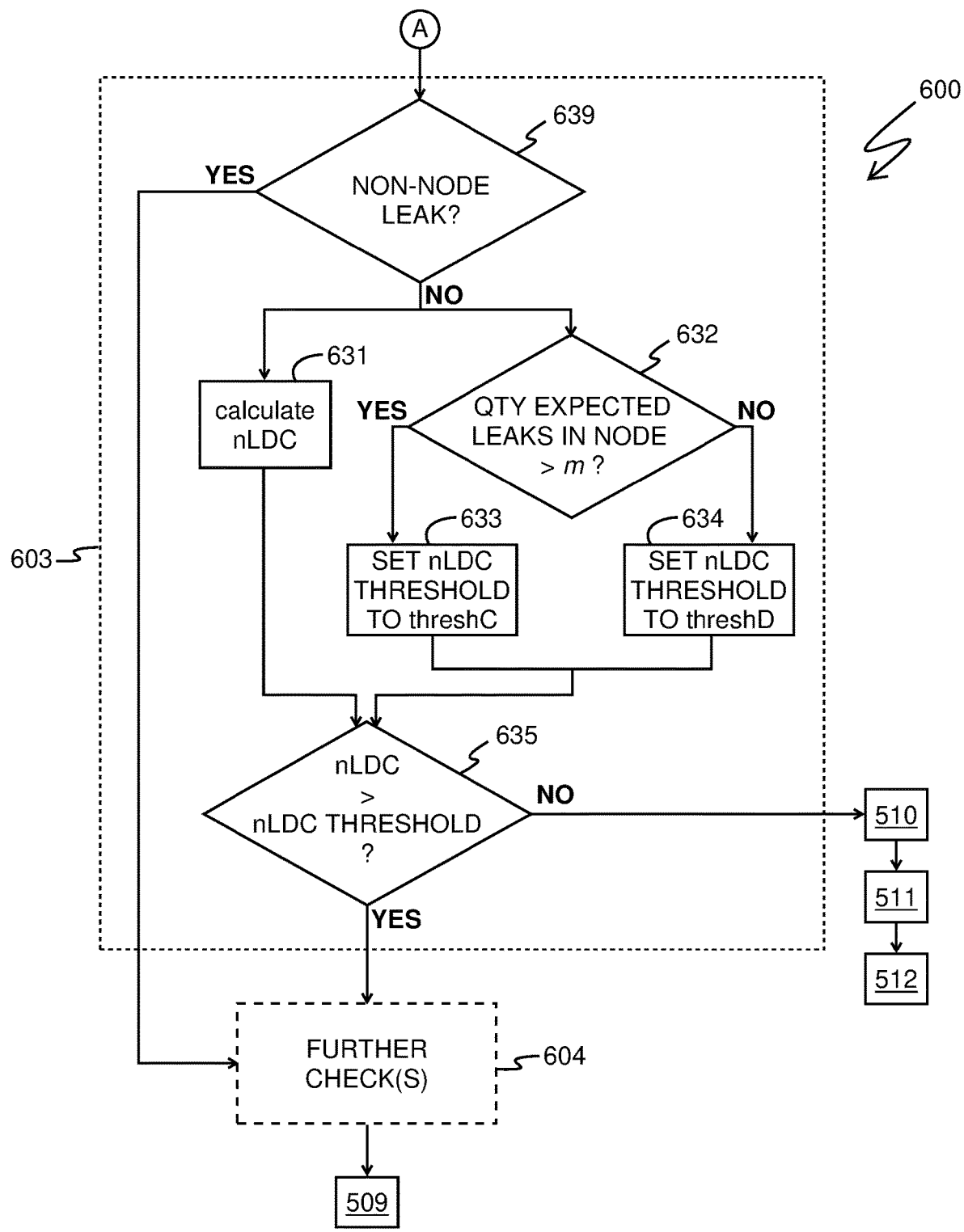

FIGS. 6A and 6B depict an exemplary process 600 detailing several exemplary checks applicable at blocks 507/508 of process 500. The exemplary checks include a driveout LDC (dLDC) check 601, a device health check 602, and a node LDC (nLDC) check 603. More generically these may be referred to as a first check 601, second check 602, and third check 603. It should be appreciated however, that the order of these checks may be any possible order, not simply the order illustrated. These checks correspond with the description above which employs the same terminology.

Different embodiments may perform a different number of checks (that is to say, apply a different numbers of fail-safe conditions). Some embodiments may have as few as a single check, whereas other may have a plurality of checks. For purposes of illustration, the process 600 in FIG. 6 shows at least three checks, of which just one, just two, or all three checks may be performed for any given record depending on the logic path. The checks are performed sequentially in process 600, but some embodiments may alternative perform some or all checks concurrently. Generally, sequential checks may minimize data processing requirements (because some checks may not need to be performed at all depending on the outcome of a preceding check), whereas parallel checks may minimize the total processing time to complete the maximum number of checks.

The first check of process 600 is a driveout LDC (dLDC) check 601. The central question of the first check 601 is whether the dLDC of the detection data 502 exceeds the dLDC threshold (block 615). Before making this comparison, the underlying values to be compared must be determined. Accordingly, at block 611 the dLDC is calculated. Recall from the description above that dLDC may be calculated as a ratio of (i) number of leaks detected on a driveout to (ii) number of leaks expected on a driveout.

Blocks 612, 613, and 614 serve to set a dLDC threshold. In some embodiments, a single threshold may be used in all cases, in which case blocks 612, 613, and 614 may be foregone. However, process 600 reflects the option to distinguish among driveouts according to sample size of leaks expected during the driveouts. In particular, process 600 illustrates decision logic which distinguishes among high-leak driveouts and low-leak driveouts, as already introduced in the description above. Block 612 decides whether the driveout in question is a high-leak or low-leak driveout. More granularly, block 612 queries whether the number of expected leaks for the driveout exceeds the predetermined quantity n referred to in the description above. If yes, process 600 sets the dLDC threshold to a first value threshA used for high-leak driveouts. Conversely, if the answer to block 612 is no, then process 600 sets the dLDC threshold to a second value threshB. Depending on the outcome of block 612, either threshA or threshB is compared at block 615 with the calculated dLDC from block 611.

If at block 615 the dLDC does not exceed the dLDC threshold, further checks may be omitted and the record 501 may be kept actionable at block 510a (corresponding with block 510 of FIG. 5). Conversely, if at block 614 the dLDC does exceed the dLDC threshold, first check 601 passes, and process 600 moves to the second check 602. Note that at this check or any check, when an LDC exactly equals a corresponding threshold, this may be treated as either passing the check, or failing the check, depending on the embodiment.

The second check of process 600 is a health status check 602. Block 625 queries whether the health status of the equipment used to collect the detection data being used in process 600 passes. If no, further checks may be omitted and the record 501 may be kept actionable at block 510. If the outcome of block 625 is yes, because the health status passes, then the process may proceed to the third check 603.

The third check of process 600 is a node LDC (nLDC) check 603. As discussed above this check may not be desirable in some embodiments or some situations, especially when dealing with rural communities or the like which have a relatively small amount of network infrastructure. Block 639 may be included to query whether or not the record 501 describes a "non-node" leak. If yes, nLDC check 603 may be skipped, and process 600 moves on to further checks 604, if any, or else to block 509. If process 600 is being performed relative to a geographic area where no "non-node leaks" exist, e.g., for a purely urban area, block 639 may not be necessary as all leaks may be assumed to exist in a node.

The central question of the third check 603 is whether the nLDC of the detection data 502 exceeds the nLDC threshold (block 635). Before making this comparison, the underlying values to be compared must be determined. Accordingly, at block 631 the nLDC is calculated. Recall from the description above that nLDC may be calculated as a ratio of (i) number of leaks detected on a later driveout which are within a node where the leak was detected on an earlier driveout and (ii) number of leaks within the node expected on the later driveout. In some embodiments, a single threshold may be used in all cases, in which case blocks 632, 633, and 634 may be foregone. However, process 600 reflects the option to distinguish among nodes according to sample size of leaks expected during the driveouts. In particular, process 600 illustrates decision logic which distinguishes among high-leak nodes and low-leak nodes, as already introduced in the description above. Block 632 decides whether the node in question is a high-leak or low-leak node. More granularly, block 632 queries whether the number of expected leaks in the node exceeds the predetermined quantity m referred to in the description above. If yes, process 600 sets the nLDC threshold to a first value threshC used for high-leak nodes. Conversely, if the answer to block 632 is no, then process 600 sets the nLDC threshold to a second value threshD. Depending on the outcome of block 632, either threshC or threshD is compared at block 635 with the calculated nLDC from block 631.

If at block 635 the nLDC does not exceed the nLDC threshold, further checks may be omitted and the record 501 may be kept actionable at block 510. Conversely, if at block 635 the nLDC does exceed the nLDC threshold, third check 603 passes, and process 600 moves to further checks 604, if any, or else to block 509. Note that at any LDC check, when an LDC exactly equals a corresponding threshold, this may be treated as either passing the check, or failing the check, depending on the embodiment.

If all the checks pass, in this case checks 601, 602, and 603 all pass, the record 501 at issue may be either deleted or updated to a non-actionable status at block 509.

Example

The following is an example leakage detection scenario which demonstrates how an exemplary method may be applied. Conditional logic pertaining to this example is provided in Table 1. This example adopts the following thresholds concerning sample sizes:

High-Leak Driveout: 6 or more existing leaks are located on a vehicle's drive path over an active window. This is the minimum number of existing leak records (expected leaks) needed to provide statistically valid driveout LDC values.

Low-Leak Driveout: 5 or fewer existing leaks are located on a vehicle's drive path over an active window. These types of driveouts do not have enough existing leak records (expected leaks) to provide statistically reliable driveout LDC values.

High-Leak Nodes: 4 or more existing leak records (expected leaks) are located on a vehicle's drive path over an active window for a single node. This is the minimum number of existing leaks needed to provide statistically reliable node LDC values.

Low-Leak Nodes: 3 or fewer existing leak records (expected leaks) are located on a vehicle's drive path over an active window for a single node. These types of nodes do not have enough existing leaks to provide statistically reliable node LDC values.

TABLE 1

Deletion Logic Table per Node

| Leak Categories | High-Leak Driveout (6 or more expected leaks) | Low-Leak Driveout (5 or less expected leaks) |
| --- | --- | --- |
| High-Leak Node (4 or more expected leaks) | Driveout LDC >20% Node LDC >20% Device Health: Good | Driveout LDC >30% Node LDC >20% Device Health: Good |
| Low-Leak Node (3 or less expected leaks) | Driveout LDC >20% Device Health: Good | Driveout LDC >30% Device Health: Good |
| Non-Node Leak | Driveout LDC >20% Device Health: Good | Driveout LDC >30% Device Health: Good |

This example uses the following scenario. A technician drives his/her vehicle during an 8 hour work day and travels through 10 different nodes. Using the drive path data for the day, the expected leakage database determines that the vehicle passed by 60 existing (expected) leaks. The leakage detection system in the vehicle found and recorded 40 of the expected leaks, thus identifying the remaining 20 non-detectable leaks as candidates for deletion.

Nine of the ten nodes had 5 or more expected leaks on the drive path within their respective boundaries. 75% of the expected leaks were found in each of the nine nodes. The tenth node only contained 2 expected leaks. Both of these leaks were not detected when the vehicle passed by their locations. The following is a summary of the Leak Categories and LDC values:

Driveout Type: High-Leak Driveout. More than 6 expected leaks were found on the drive path over the 8 hour active window. 40 expected leaks were found on the driveout.

Driveout LDC: =detected leaks/expected leaks=40 detected/60 expected=66.6%

Node types: There are nine High-Leak node types as they contain more than 4 expected leaks with each of their respective boundaries. The tenth node is a Low-Leak node type as it only has 2 expected leaks. Using a pre-selected/pre-set threshold, nodes with 3 or fewer expected leaks are classified as Low-Leak nodes.

Node LDC: All nine of the High-leak Nodes have a Node LDC >75%. The tenth node is a Low-Leak Node has a Node LDC of 0% as no leaks were detected in this node.

Device Health: The status report for this device health is reported to be Good.

All ten of the nodes in this scenario are part of a High-Leak Driveout thus this category will be used in Table 1. Nine of the nodes will use the High-Leak Node category, one of the nodes will use the Low-Leak Node category.

The nine High-Leak nodes have a Driveout LDC of 66.6% which is greater than the 20% threshold requirement. The Node LDC value for these nine nodes >75% which is greater than the 20% threshold requirement. The Device health is good. Thus 18 non-detectable leaks from these nine nodes will be deleted from the existing leakage data base.

The one Low-leak node type is also part of the high-leak driveout category. Using the Low-Leak Node and the High-Leak Driveout criteria in Table 1: Driveout LDC=66.6% which is greater than the 30% threshold. The Device Health status must be used to provide a double health confidence level: Status=good. Thus, the two non-detectable leaks in this node will be deleted from the existing leak database. The Node LDC value was not used as part of the pass/fail criteria as there were not enough existing leaks in this node to produce a statically reliable number. This is true of all Low-Leak Nodes.

The present invention may be or include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Where a range of values is provided in this disclosure, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described.

As used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only", and the like in connection with the recitation of claim elements, or use of a "negative" limitation.

As will be apparent to those of skill in the art upon reading this disclosure, each of the individual embodiments described and illustrated herein has discrete components and features which may be separated from or combined with the features of any of the other several embodiments without departing from the scope or spirit of the present invention. Any recited method can be carried out in the order of events recited or in any other order which is logically possible.

While exemplary embodiments of the present invention have been disclosed herein, one skilled in the art will recognize that various changes and modifications may be made without departing from the scope of the invention as defined by the following claims.

What is claimed is:

1. A method of maintaining cable infrastructure involving a leak which was detected on an earlier driveout of one or more earlier driveouts and which was not redetected on a later driveout, the method comprising
    detecting leaks and corresponding leak locations with leakage detection equipment as one or more vehicles traverse a network during the one or more earlier driveouts;
    tracking what leaks are detected and where they are detected on the later driveout as a vehicle traverses the network along a driveout path;
    determining for the later driveout a first leakage detection confidence (LDC) as a ratio of (i) number of leaks detected to (ii) number of leaks expected based on the one or more earlier driveouts;
    comparing the first LDC with a first threshold; and
    deploying a technician to repair the leak if one or more fail safe conditions are met, the one or more fail safe conditions comprising: the first LDC fails to exceed the first threshold.

2. The method of claim 1, wherein the first LDC is a driveout LDC which is a ratio of (i) number of leaks detected on the later driveout to (ii) number of leaks expected on the later driveout.

3. The method of claim 2, wherein the first threshold has a value which is determined based on the number of leaks expected on the later driveout.

4. The method of claim 2, wherein the one or more fail safe conditions further comprise: a detector which collected leakage data on the later driveout receives a fail rating for device health.

5. The method of claim 1, further comprising
    determining for the later driveout a second LDC; and
    comparing the second LDC with a second threshold,
    wherein the one or more fail safe conditions further comprise: the second LDC fails to exceed the second threshold,
    wherein the first LDC is a driveout LDC which is a ratio of (i) number of leaks detected on the later driveout to (ii) number of leaks expected on the later driveout,
    wherein the second LDC is a node LDC which is a ratio of (i) number of leaks detected on the later driveout which are within a node on a driveout path and (ii) number of leaks within the same node expected on the later driveout.

6. The method of claim 5, wherein
    the first threshold has a value which is determined based on the number of leaks expected on the later driveout, and
    the second threshold has a value which is determined based on the number of leaks within the same node expected on the later driveout.

7. The method of claim 5, wherein the one or more fail safe conditions further comprise: a detector which collected the leakage data on the later driveout receives a fail rating for device health.

8. The method of claim 1, wherein the one or more fail safe conditions further comprise: no redetection is attributed or attributable to a weather event or weather condition.

9. A method of maintaining cable infrastructure, comprising
    detecting leaks and corresponding leak locations with leakage detection equipment as one or more vehicles traverse a network during one or more earlier driveouts;
    tracking what leaks are detected and where they are detected on the later driveout as a vehicle traverses the network along a driveout path;
    (a) for each leakage record of one or more existing leak records, identifying those for which there was no redetection on the later driveout but a plurality of fail-safe conditions are satisfied, the plurality of fail-safe conditions comprising
        a driveout leakage detection confidence (dLDC) fails to exceed a first threshold, and
        one or more of (i) a detector which collected leakage data on the later driveout receives a fail rating for device health, and (ii) a node leakage detection confidence (nLDC) for a node associated with the leakage record fails to exceed a second threshold; and
    (b) deploying a technician to repair a leak indicated by a leakage record identified in step (a),
    wherein the dLDC is a ratio of (i) number of leaks detected on the later driveout to (ii) number of leaks expected on the later driveout based on the one or more earlier driveouts, and
    wherein the nLDC is a ratio of (i) number of leaks detected on the later driveout which are within a node on the driveout path and (ii) number of leaks within the same node expected on the later driveout based on the one or more earlier driveouts.

10. The method of claim 9, wherein
    the first threshold has a value which is determined based on the number of leaks expected on the later driveout, and
    the second threshold has a value which is determined based on the number of leaks within the same node expected on the later driveout.

11. The method of claim 9, wherein the one or more fail safe conditions further comprise: no redetection is attributed or attributable to a weather event or weather condition.

12. The method of claim 9, wherein the one or more fail safe conditions include both of (i) the detector which collected leakage data on the later driveout receives a fail rating for device health, and (ii) the nLDC for the node associated with the leakage record fails to exceed the second threshold.

13. A method of maintaining cable infrastructure, the method comprising
    detecting leaks and corresponding leak locations with leakage detection equipment as one or more vehicles traverse a network during one or more earlier driveouts;

tracking what leaks are detected and where they are detected on a later driveout as a vehicle traverses the network along a driveout path;

for a leak which was detected on an earlier driveout of the one or more earlier driveouts and which was not redetected on the later driveout, determining for the later driveout a first leakage detection confidence (LDC) as a ratio of (i) number of leaks detected to (ii) number of leaks expected based on the one or more earlier driveouts;

comparing the first LDC with a first threshold; and maintaining or changing a record of the leak to actionable status for deployment of a technician to repair the leak if one or more fail safe conditions are met, the one or more fail safe conditions comprising: the first LDC fails to exceed the first threshold.

14. The method of claim 13, wherein the first LDC is a driveout LDC which is a ratio of (i) number of leaks detected on the later driveout to (ii) number of leaks expected on the later driveout.

15. The method of claim 14, wherein the first threshold has a value which is determined based on the number of leaks expected on the later driveout.

16. The method of claim 14, wherein the one or more fail safe conditions further comprise: a detector which collected leakage data on the later driveout receives a fail rating for device health.

17. The method of claim 13, further comprising
determining for the later driveout a second LDC; and
comparing the second LDC with a second threshold,
wherein the one or more fail safe conditions further comprise: the second LDC fails to exceed the second threshold,
wherein the first LDC is a driveout LDC which is a ratio of (i) number of leaks detected on the later driveout to (ii) number of leaks expected on the later driveout,
wherein the second LDC is a node LDC which is a ratio of (i) number of leaks detected on the later driveout which are within a node on a driveout path and (ii) number of leaks within the same node expected on the later driveout.

18. The method of claim 17, wherein
the first threshold has a value which is determined based on the number of leaks expected on the later driveout, and
the second threshold has a value which is determined based on the number of leaks within the same node expected on the later driveout.

19. The method of claim 17, wherein the one or more fail safe conditions further comprise: a detector which collected the leakage data on the later driveout receives a fail rating for device health.

20. The method of claim 13, wherein the one or more fail safe conditions further comprise: no redetection is attributed or attributable to a weather event or weather condition.

* * * * *